US012792978B2

(12) United States Patent
Xiao et al.

(10) Patent No.: US 12,792,978 B2
(45) Date of Patent: Nov. 10, 2026

(54) SYSTEMS AND METHODS FOR ASSET MAINTENANCE PLANNING

(71) Applicant: ROYAL BANK OF CANADA, Toronto (CA)

(72) Inventors: Ding Xiao, Toronto (CA); Christine Joseph, Milton (CA); Patrick Bulmer, Bowmanville (CA); Chris S. Gilbert, Hamilton (CA); Soheil Banifatemi, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 155 days.

(21) Appl. No.: 18/776,973

(22) Filed: Jul. 18, 2024

(65) Prior Publication Data

US 2025/0037045 A1 Jan. 30, 2025

Related U.S. Application Data

(60) Provisional application No. 63/529,225, filed on Jul. 27, 2023.

(51) Int. Cl.
*G06Q 10/00* (2026.01)
*G06Q 10/047* (2023.01)
*G06Q 10/20* (2023.01)

(52) U.S. Cl.
CPC ........... *G06Q 10/047* (2013.01); *G06Q 10/20* (2013.01)

(58) Field of Classification Search
CPC ............................ G06Q 10/047; G06Q 10/20
See application file for complete search history.

(56) References Cited

U.S. PATENT DOCUMENTS 11,364,943 B1 * 6/2022 Brick .................... B61L 23/042
2003/0120677 A1 * 6/2003 Vernon .................. G06Q 10/08 707/999.102
2009/0048948 A1 * 2/2009 Pan-Chen .............. G06Q 10/06 705/28

(Continued)

FOREIGN PATENT DOCUMENTS

CN 109583845 A * 4/2019 ........... G06Q 10/103
CN 111366160 A * 7/2020 ............. G01C 21/20

(Continued)

*Primary Examiner* — Peter D Nolan
*Assistant Examiner* — Peter Y Ning
(74) *Attorney, Agent, or Firm* — NORTON ROSE FULBRIGHT CANADA LLP

(57) ABSTRACT

Systems and methods for maintaining IT assets are disclosed. An example computer system may include: a processor; and a non-transitory memory storing one or more sets of instructions that when executed by the processor, causes the system to: access or receive asset data for a plurality of IT assets located in a plurality of physical locations; determine, based on the asset data, a plurality of assets due for maintenance; access or receive, in real time, map data for physical locations associated with the plurality of assets; determine a cost matrix for scheduling a route plan for visiting the physical locations associated with the plurality of assets; compute the route plan based on the cost matrix and the map data; generate signals for displaying, at a display of a user device, the route plan; and transmit said signals to the user device for displaying the route plan.

20 Claims, 15 Drawing Sheets

(56) References Cited

U.S. PATENT DOCUMENTS

| | | | | |
|---|---|---|---|---|
| 2014/0089032 | A1* | 3/2014 | Bell | G06Q 10/06313 705/7.24 |
| 2014/0330749 | A1* | 11/2014 | Candas | G06Q 40/06 705/36 R |
| 2016/0078695 | A1* | 3/2016 | McClintic | G07C 5/0816 701/29.4 |
| 2016/0357876 | A1* | 12/2016 | Ali | G06Q 10/087 |

FOREIGN PATENT DOCUMENTS

| | | | | | |
|---|---|---|---|---|---|
| CN | 117010824 | A | * | 11/2023 | G06Q 10/103 |
| JP | 2004118500 | A | * | 4/2004 | |
| JP | 2008015845 | A | * | 1/2008 | |
| WO | WO-2008086373 | A2 | * | 7/2008 | G06Q 10/06313 |
| WO | WO-2011042286 | A1 | * | 4/2011 | B64F 5/60 |

* cited by examiner

200

600

| Trip # | From | To | Direction | Assets to be serviced | Residual Cost | Travel Time (hour) |
|---|---|---|---|---|---|---|
| 1 | 123 ABC Rd., Ottawa | 345 DEF Ave., Ottawa | *<url to map>* | 3 | 0 | 4.996 |
| 2 | 345 DEF Ave., Ottawa | 643 GHI Blvd., Ottawa | *<url to map>* | 5 | 0 | 0.684 |
| 3 | 643 GHI Blvd., Ottawa | 432 JKL Dr., Ottawa | *<url to map>* | 2 | 0 | 0.205 |
| 4 | 432 JKL Dr., Ottawa | 170 King St. W., Ottawa | *<url to map>* | 7 | 0 | 0.573 |
| ... | ... | ... | ... | ... | ... | ... |

FIG. 6

900

> 50 km

| Locations | | Hegira | PHP | NN | CA |
|---|---|---|---|---|---|
| NB | 25 | 15.994 | 17.368 | 21.066 | 17.364 |
| MB | 28 | 49.541 | 56.471 | 50.487 | 54.367 |
| NS | 32 | 25.493 | 25.432 | 25.781 | 26.206 |
| QC | 58 | 70.297 | 87.711 | 82.156 | 76.582 |
| SK | 58 | 44.867 | 56.492 | 53.207 | 54.917 |
| AB | 91 | 56.075 | 75.263 | 69.556 | 59.723 |
| BC | 90 | 94.324 | 131.391 | 102.234 | 98.817 |

950

< 50 km

| Locations | | Hegira | PHP | NN | CA |
|---|---|---|---|---|---|
| SK | 7 | 0.654 | 0.693 | 0.713 | 0.721 |
| NS | 25 | 4.922 | 5.708 | 5.568 | 5.192 |
| MB | 29 | 3.243 | 3.502 | 3.706 | 3.73 |
| AB | 51 | 5.99 | 7.928 | 7.207 | 6.85 |
| QC | 97 | 10.765 | 13.421 | 12.889 | 12.47 |
| BC | 98 | 11.054 | 14.269 | 13.039 | 12.091 |
| NB | 9 | 2.488 | 2.58 | 2.659 | 2.612 |

FIG. 9

SYSTEMS AND METHODS FOR ASSET MAINTENANCE PLANNING

CROSS-REFERENCE TO RELATED APPLICATION

This application claims the benefit of and priority to U.S. provisional patent application No. 63/529,225, filed Jul. 27, 2023, which is herein incorporated in its entirety by reference.

FIELD

Embodiments of the present disclosure relate to the field of technical resource planning, and more specifically to a computer system for technology asset monitoring and maintenance based on real time network data in an environment of limited computing resources.

INTRODUCTION

A large organization has a variety of technology assets and resources that require maintenance and refresh. Such technology assets may include, for example, computing resources including computer desktops or laptops for employees, database servers located at various office buildings, and so on. Maintenance of these assets may include monitoring and identification of assets that need to be refreshed or retired, and advanced planning to deploy technicians for asset refresh, repair, or retirement, which amount to a significant challenge when the organization has a large number of office locations spread across multiple cities and states.

In addition, while the goal of preventive maintenance of IT assets is carried out to minimize unproductive downtime associated with unexpected failures of IT equipment, over-maintenance of IT assets based on a fixed schedule, or executed on an on-call basis, may be unnecessary, computationally expensive, and too costly.

SUMMARY

In accordance with one aspect, there is provided a computer system for maintaining IT assets, the computer system may include a processor and a non-transitory memory storing one or more sets of instructions, which when executed by the processor, causes the system to: access or receive asset data for a plurality of IT assets located in a plurality of physical locations; determine, based on the asset data, a plurality of assets due for maintenance; access or receive, in real time, map data for physical locations associated with the plurality of assets due for maintenance; determine a cost matrix for scheduling a route plan for visiting the physical locations associated with the plurality of assets due for maintenance; compute the route plan based on the cost matrix and the map data; generate signals for displaying, at a display of a user device, the route plan; and transmit said signals to the user device for displaying the route plan.

In some embodiments, the plurality of assets due for maintenance is determined based on a pre-defined set of criteria.

In some embodiments, the respective asset data for each asset in the plurality of IT assets comprises a respective network address indicating a physical location of said asset.

In some embodiments, the cost matrix is determined based on one or more of: an end-of-life date for each of at least two respective assets due for maintenance, a residual cost for each of the at least two respective assets due for maintenance, an hourly rate for a technician engaged to perform the maintenance for the at least two respective assets due for maintenance; and an estimated travel time and travel distance for the two physical locations associated with the least two respective assets due for maintenance based on the map data.

In some embodiments, the cost matrix is determined based on:

$$\text{Cost}_{i,j} = \mathit{TravelTime}_{i,j} \cdot \mathit{HourlyRate} + \text{Distance}_{i,j} \cdot \mathit{DistanceCost} + |\text{Max}(\mathit{EolDate}_i) - \text{Max}(\mathit{EolDate}_j)| \cdot \frac{\Sigma \mathit{ResidualCost}}{\Sigma(\mathit{EolDate} - \text{Today})} \cdot \mathit{DepreciationDiscount}$$

where i represents a first physical location for a first asset from the at least two respective assets due for maintenance and j represents a second physical location for a second asset from the at least two respective assets due for maintenance.

In some embodiments, a respective cost matrix is determined for each respective pair of assets due for maintenance in the plurality of assets due for maintenance.

In some embodiments, the route plan is computed based on the cost matrix and a set of constraints.

In some embodiments, the set of constraints include two or more of: an estimated service time per asset, a maximum duration for each trip, a maximum service period per physical location, and a predefined service window.

In some embodiments, the route plan is computed in advance based on the map data and the physical locations associated with the plurality of assets due for maintenance.

In some embodiments, the route plan is updated each time a new physical location is added as a result of additional assets identified due for maintenance.

In accordance with another aspect, there is provided a computer-implemented method for maintaining IT assets, the method may include: accessing or receiving asset data for a plurality of IT assets located in a plurality of physical locations; determining, based on the asset data, a plurality of assets due for maintenance from the plurality of IT assets; accessing or receiving, in real time, map data for physical locations associated with the plurality of assets due for maintenance; determining a cost matrix for scheduling a route plan for visiting the physical locations associated with the plurality of assets due for maintenance; computing the route plan based on the cost matrix and the map data for the physical locations associated with the plurality of assets due for maintenance; generating signals for displaying, at a display of a user device, the route plan; and transmitting said signals to the user device for displaying the route plan.

In some embodiments, the plurality of assets due for maintenance is determined based on a pre-defined set of criteria.

In some embodiments, the respective asset data for each asset in the plurality of IT assets comprises a respective network address indicating a physical location of said asset.

In some embodiments, the cost matrix is determined based on one or more of: an end-of-life date for each of at least two respective assets due for maintenance, a residual cost for each of the at least two respective assets due for maintenance, an hourly rate for a technician engaged to perform the maintenance for the at least two respective assets due for maintenance; and an estimated travel time and travel distance for the two physical locations associated with the least two respective assets due for maintenance based on the map data.

In some embodiments, the cost matrix is determined based on:

$$\text{Cost}_{i,j} = TravelTime_{i,j} \cdot HourlyRate + \text{Distance}_{i,j} \cdot DistanceCost + |\text{Max}(EolDate_i) - \text{Max}(EolDate_j)| \cdot \frac{\Sigma ResidualCost}{\Sigma(EolDate - \text{Today})} \cdot DepreciationDiscount$$

where i represents a first physical location for a first asset from the at least two respective assets due for maintenance and j represents a second physical location for a second asset from the at least two respective assets due for maintenance.

In some embodiments, the method includes determining a respective cost matrix is for each respective pair of assets due for maintenance in the plurality of assets due for maintenance.

In some embodiments, the route plan is computed based on the cost matrix and a set of constraints.

In some embodiments, the set of constraints include two or more of: an estimated service time per asset, a maximum duration for each trip, a maximum service period per physical location, and a predefined service window.

In some embodiments, the method includes computing the route plan in advance based on the map data and the physical locations associated with the plurality of assets due for maintenance.

In some embodiments, the method includes: receiving asset data for an additional asset identified due for maintenance; updating the route plan when the additional asset is associated with a new physical location.

In accordance with yet another one aspect, there is provided a non-transitory computer readable medium storing machine interpretable instructions, which when executed by a processor, cause the processor to perform: accessing or receiving asset data for a plurality of IT assets located in a plurality of physical locations; determining, based on the asset data, a plurality of assets due for maintenance from the plurality of IT assets; accessing or receiving, in real time, map data for physical locations associated with the plurality of assets due for maintenance; determining a cost matrix for scheduling a route plan for visiting the physical locations associated with the plurality of assets due for maintenance; computing the route plan based on the cost matrix and the map data for the physical locations associated with the plurality of assets due for maintenance; generating signals for displaying, at a display of a user device, the route plan; and transmitting said signals to the user device for displaying the route plan.

BRIEF DESCRIPTION OF THE FIGURES

In the Figures, embodiments are illustrated by way of example. It is to be expressly understood that the description and figures are only for the purpose of illustration and as an aid to understanding.

Embodiments will now be described, by way of example only, with reference to the below figures:

FIG. 6 shows an example route plan including multiple trips for maintaining IT assets, the route plan generated by an example system shown in FIG. 1, in accordance with some embodiments;

FIG. 9 shows example data from benchmark tests conducted based on a number of implemented route planning algorithms, in accordance with some embodiments;

DETAILED DESCRIPTION

Throughout the disclosure, numerous references will be made regarding information technology (IT) equipment and related services. For clarity, the following terms are hereby defined.

IT equipment, IT asset, or asset: including, without limitation, desktops, laptops, computer hardware, servers and ancillary equipment, routers, switches, hubs, mobile devices, tablet devices, smartphones, data storage devices, networking equipment, printers, scanners, cameras, telephones, and software for any hardware devices including operating systems, productivity software, and specialized applications used to support business processes and operations.

maintenance: all types of maintenance activities for IT equipment including, without limitation: installing, updating or replacing a hardware or software component, deploying one or more software components or hardware equipment, migrating one or more application or operating system to another server including cloud server, and refreshing, repairing, renewing, re-imaging and/or retiring of IT equipment.

asset due for maintenance (also referred to as "problem assets"): any asset requiring maintenance, also referred to as target asset.

deployment ring: a cluster of assets grouped based on one or more criteria, typically corresponding to a physical region (e.g., province of Ontario or state of New York) and may contain assets spreading around multiple physical locations in the physical region.

Figure 1:
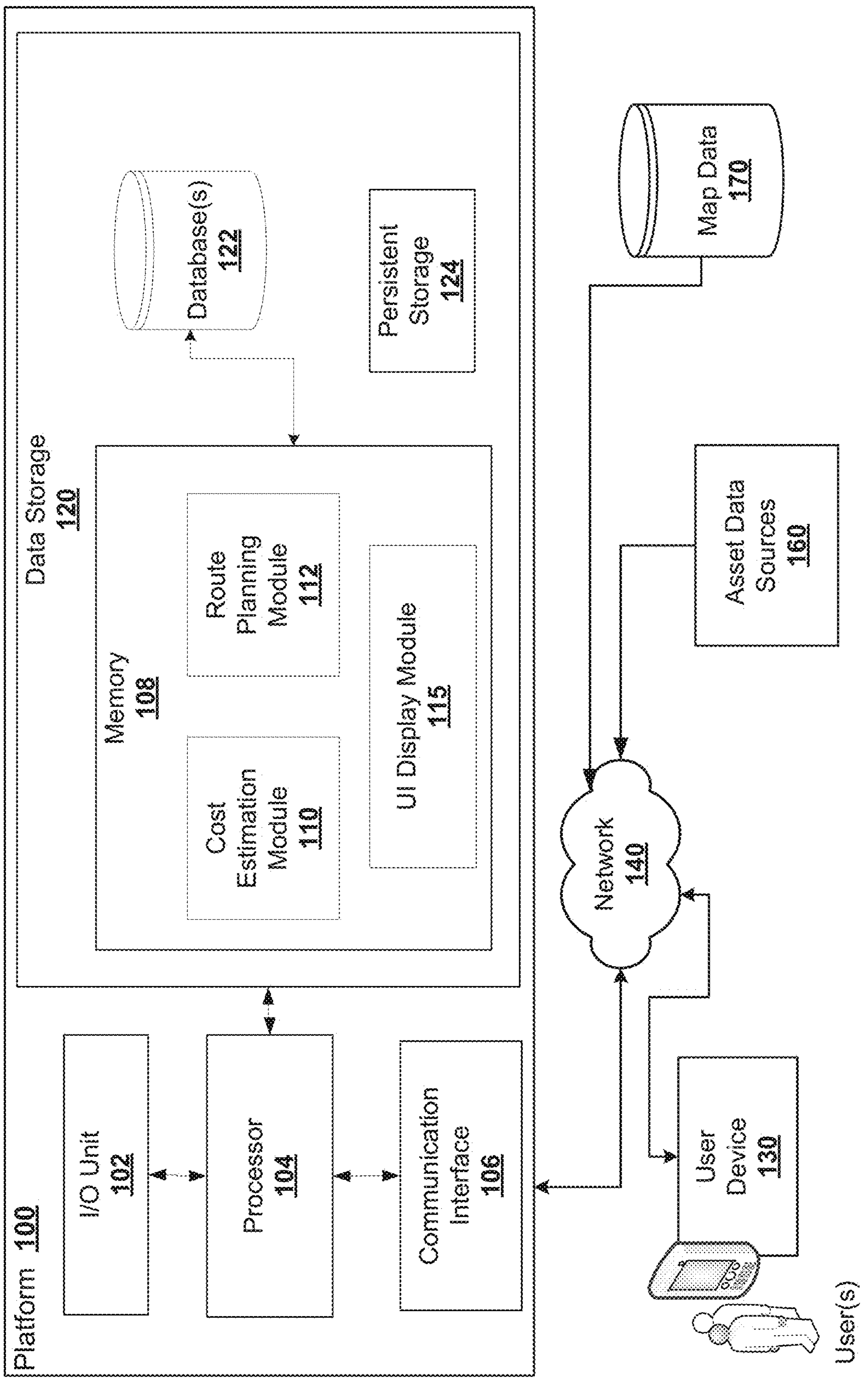
FIG. 1 shows an example system for maintaining IT assets, in accordance with some embodiments.

Hegira: a codename for system 100 in FIG. 1, in accordance with some embodiments.

route, route plan, route schedule: a particular order of one or more trips, each trip having a respective origin and a respective destination. A route may be associated with and computed for a deployment ring, which is a route to service or maintain all the assets in the deployment ring.

route planning: the process of generating and/or updating a route.

DSS, DSS Hub, Hub, or Service Center: an office or team located in a physical location for supporting and maintaining IT equipment located in surrounding areas.

technician: anyone appointed to service or maintain IT equipment.

End-of-Life (EOL): an EOL date for an asset is a projected date on which the asset should be replaced or retired.

Service Window: a time frame during which a technician is scheduled to arrive at a physical location to perform maintenance activities for one or more assets.

In accordance with one aspect, a system or platform 100, such as the one shown in FIG. 1, is implemented to automate and facilitate process for IT asset maintenance, including identifying assets that need to be maintained, serviced, or refreshed, presenting a visualization for said assets with location information, and generating and optimizing a route for one or more technician to maintain the assets with minimal cost.

Coordinating IT maintenance activities for a large number of physical locations (e.g., over 50 offices) with limited resources presents several challenges. For instance, time management is a major challenge as maintaining all IT assets requires significant effort and resources. A corporation typically needs to prioritize certain office locations (e.g., customer-facing branches) and ensure that critical systems are updated first to optimize the use of the limited resources. For another example, limited resources means allocation of said resources across all office locations requires careful planning. There is a need to balance the cost of the maintenance activities with the need to ensure that all offices have up-to-date IT assets in operation.

To overcome these challenges, the systems and methods as disclosed herein leverage various data points to generate and optimize a maintenance plan including a route for executing the maintenance plan. In some embodiments, a system implements an algorithm that incorporates routing and other critical factors to ensure that the maintenance process is streamlined and efficient. The system may facilitate coordination of IT maintenance across multiple offices in multiple physical locations with minimal disruption to operations, ultimately enabling a user (such as a corporation) to maintain IT assets at peak performance levels and extend their lifecycles.

This disclosed systems and methods also help with reduction of costs associated with asset maintenance. By optimizing the process and minimizing the need for manual coordination and verification, the amount of time and resources required to maintain each asset is greatly reduced, which can translate into significant cost savings over time.

Additionally, the disclosed systems and methods further help to minimize the risk of disruptions caused by asset maintenances. By coordinating the maintenances process more efficiently, the likelihood of downtime or service interruptions can be reduced, leading to greater employee productivity and customer satisfaction.

FIG. 1 is a high-level schematic diagram of an example computer-implemented system 100 (also referred to as platform 100) for maintaining IT assets, exemplary of some embodiments.

System 100 includes an I/O unit 102, a processor 104, communication interface 106, and data storage 120. The I/O unit 102 can enable system 100 to interconnect with one or more input devices, such as a keyboard, mouse, camera, touch screen and a microphone, and/or with one or more output devices such as a display screen and a speaker.

Data storage 120 including a memory device 108 (also referred to as memory 108), a local database 122, and persistent storage 124. Memory 108 include one or more instruction modules stored thereon, such as for example, cost estimation module 110, route planning module 112, and user interface (UI) display module 115.

Processor 104 is configured to execute machine-executable instructions to perform processes disclosed herein, including computing a cost matrix based on instructions in cost estimation module 110, generating and optimizing a route plan based on instructions in route planning module 112, and generating signals for displaying the route plan at a user device 130 based on instructions in UI display module 115.

System 100 can connect to an interface application installed on user device 130 to exchange signals representing a route plan. The interface application interacts with the system 100 to exchange data (including control commands) and generates visual elements for display at user device. The visual elements can represent one or more trips in the route plan.

System 100 can connect to different data sources, including third party sources to receive input data or to transmit other data. For instance, system 100 can receive and transmit asset data from internal and/or external data sources 160, and to receive map data in real time from third party map providers such as Google™ Maps. The data can be transmitted and received via network 140 (or multiple networks), which is capable of carrying data and can involve wired connections, wireless connections, or a combination thereof. Network 140 may involve different network communication technologies, standards and protocols, for example.

Processor 104 can execute instructions in memory 108 to implement aspects of processes described herein. Processor 104 can execute instructions in memory 108 to configure various components and functions described herein. Processor 104 can be, for example, any type of general-purpose microprocessor or microcontroller, a digital signal processing (DSP) processor, an integrated circuit, a field programmable gate array (FPGA), a reconfigurable processor, or any combination thereof.

Memory 108 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 120 can include memory 108, databases 122, and persistent storage 124.

Communication interface 106 can enable system 100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

System 100 can be operable to register and authenticate users (using a login, unique identifier, and password for example) prior to providing access to system 100. For example, user authentication process may be handled via an authentication module (not shown).

Data storage 120 may be configured to store information associated with or created by the components in memory 108 and may also include machine executable instructions. Memory 108 may be persistent memory storage. Data storage 120 includes a persistent storage 124 which may involve various types of storage technologies, such as solid state drives, hard disk drives, flash memory, and may be stored in various formats, such as relational databases, non-relational databases, flat files, spreadsheets, extended markup files, etc.

System 100 is configured to perform IT asset monitoring and maintenance based on real time data and available resources. In some embodiments, system 100 is configured to identify assets due for maintenance, and further perform optimization process for scheduling and routing resources based on a given set of assets for maintenance in multiple physical locations. In some embodiments, system 100 is configured to update or revise one or more trips in the route plan based on real time information from a technician during a trip.

Figure 2:
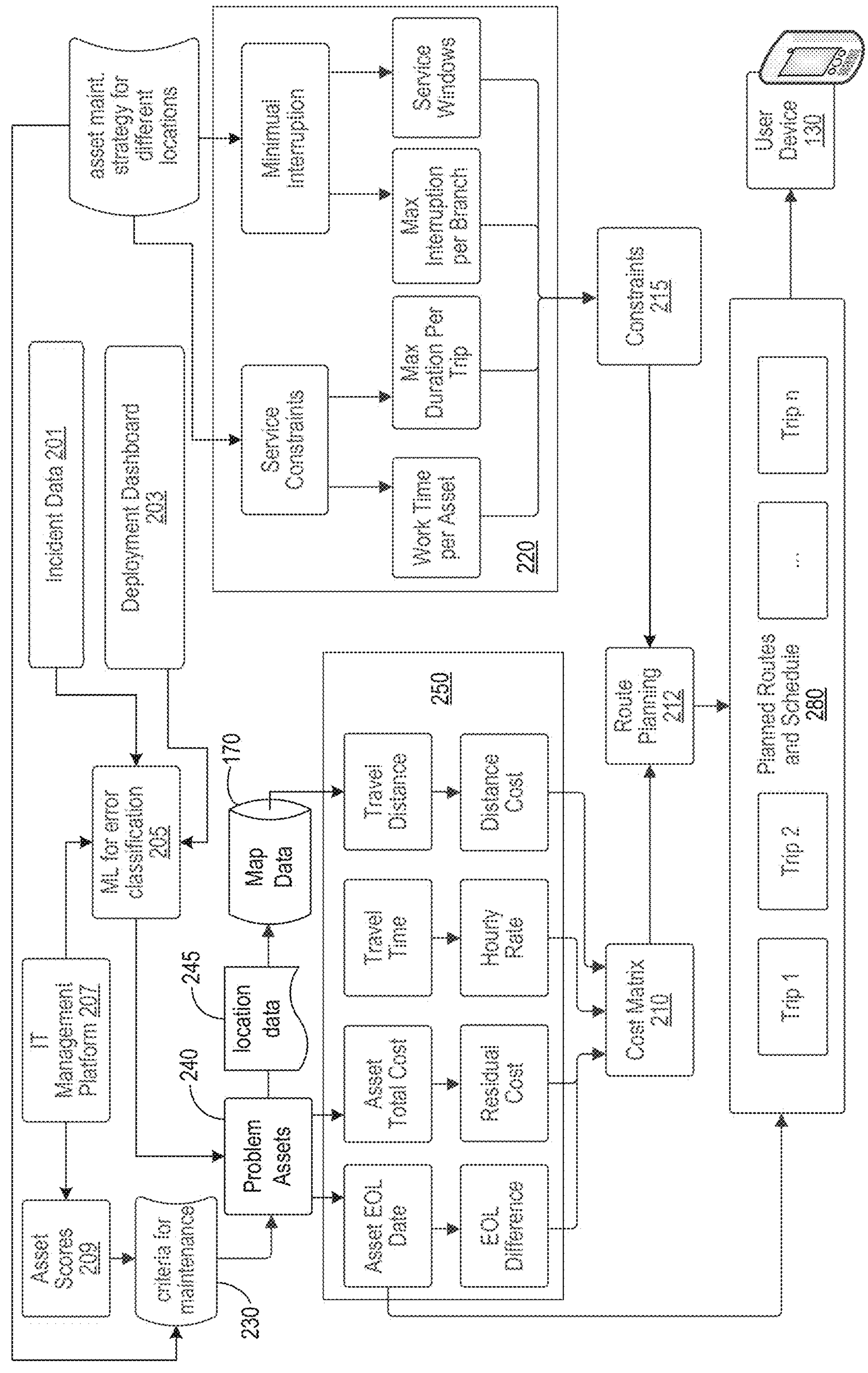
FIG. 2 is a schematic block diagram of an example data flow for maintaining IT assets, in accordance with some embodiments.
Figure 3:
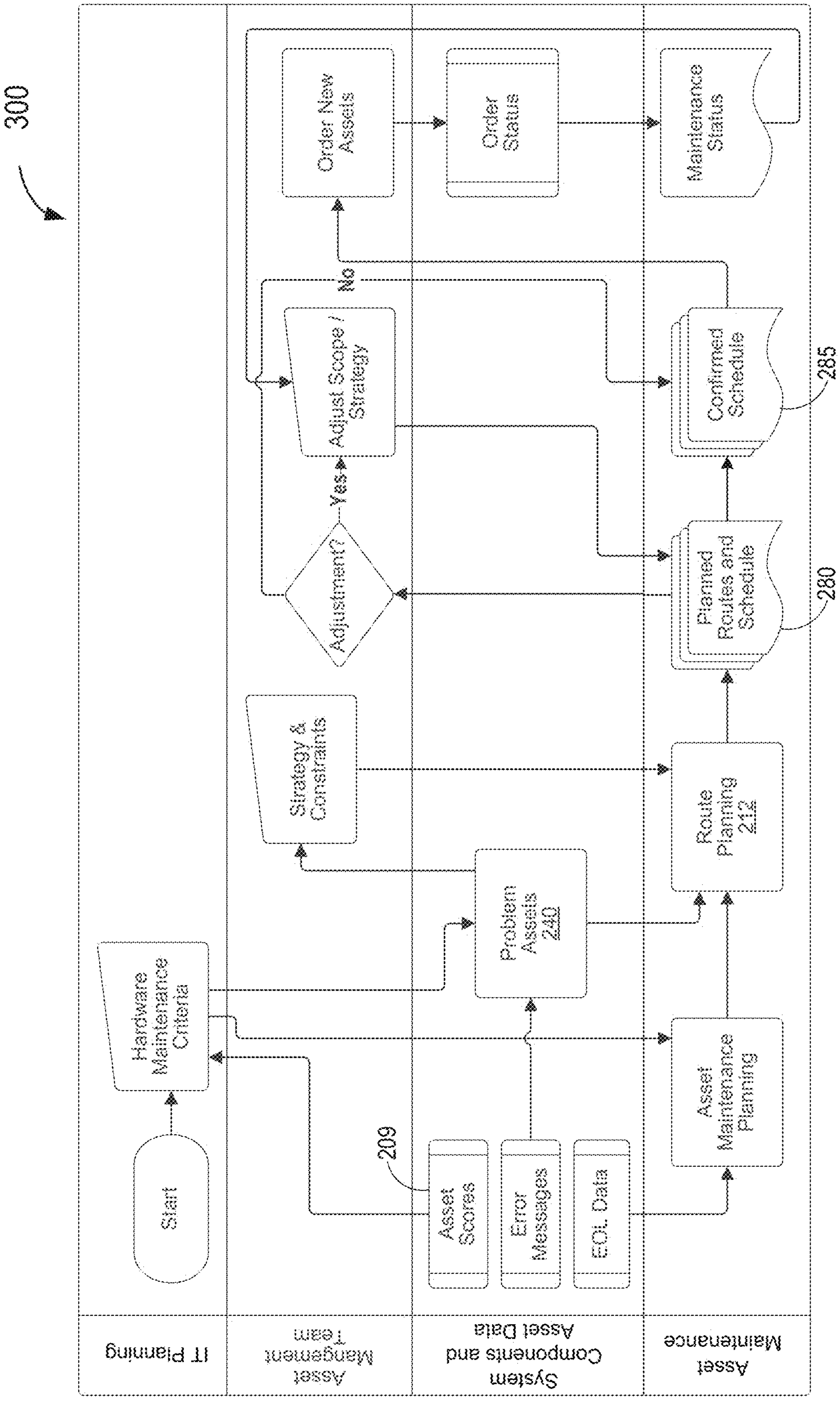
FIG. 3 is a schematic block diagram of an example process flow for maintaining IT assets, in accordance with some embodiments.

FIG. 2 is a schematic block diagram of an example data flow 200 for maintaining IT assets, in accordance with some embodiments. Even though FIG. 2 primarily shows a data flow, some components shown in FIG. 2 are entities for storing, receiving or generating data. The example data flow 200 presented in FIG. 2 is now described with reference to one or more example processes, including the example process flow 300 in FIG. 3. The processes described herein may be performed by components of system 100 in accordance with instructions stored in memory 108.

System 100 may be a system in an IT ecosystem deployed to manage IT assets for a corporation. System 100 may interface with one or more asset data sources 160, including for example an IT management platform 207, a digital employee experience platform (e.g., 1E Tachyon™), a service desk system for reporting incident data 201 for assets, and a deployment dashboard 203 (e.g., Windows™ OS/Task Sequence Deployment Automation Tool, or as part of Microsoft™ Endpoint Configuration Manager or MECM) in the IT ecosystem. System 100 may also connect to one or more third party map databases such as OpenStreet™ Map or Google™ Maps for receiving map data 170.

Input data may be received by system 100 from the above mentioned data sources for identifying assets 240 due for maintenance. Criteria for maintenance 230 include a set of logic or rules stored by system 100 and executed to determine assets 240. Criteria for maintenance 230 includes, for example, logics relating to asset scores 209.

In some embodiments, application health data or other types of evaluation data from IT management platform 207 may be used to generate, by system 100, an asset score 209 for each asset in a plurality of identified assets. The asset score 209 for an asset may be a value representing an overall condition or health of the asset. The asset score 209 may include, in some embodiments, a present score A for said asset, and optionally, a future score B if and when certain maintenance activities are completed for the asset by a certain date in the future. The asset scores 209 may be used in part by cost estimation module 110 to compute a cost matrix 210, as further elaborated below. In some embodiments, when the present score A meets a certain threshold (e.g., lower than a predefined minimum score), the asset may be identified as a asset 240 due for maintenance.

In some embodiments, system 100 includes a machine learning (ML) module 205 configured to generate one or more error classifications based on one or more error messages from another system such as a service desk system for reporting incident data 201, deployment dashboard 203 and/or an IT management platform 207. The output from machine learning module 205 may be used to identify assets 240. For instance, if an error message from deployment dashboard 203 is classified by ML module 205 to indicate that the associated asset has problems running a recently installed application, the associated asset may be identified by system 100 as asset 240. The output of ML module 205 may be included as part of criteria for maintenance 230, or may be used as a standalone factor in determining assets 240.

In some embodiments, a batch of data may be processed each night by system 100, leveraging NLP Classification Algorithm in ML module 205, system 100 may receive or otherwise determine application information, compatibility of the application to an operating system (OS), and then calculates the application readiness for each individual asset. Hardware qualification and migration status can be synchronized automatically.

In some embodiments, rules used to generate logics for determining identifying assets 240 may include:

End of life date approaching;

Hardware Model is not compatible with the new OS; or.

Hardware such as RAM does not meet the minimum requirement.

In some embodiments, system 100 may import Asset Management data from ServiceNow™ on daily basis to get EOL information of each asset as well as its residual costs if EOL date has not reached. System 100 may also import MECM Driver information on daily basis to identify the assets which is incompatible with an OS.

In some embodiments, additional programming logic may be implemented for determining or identifying assets 240; the additional programming logic may be included as part of criteria for maintenance 230. Such additional programming logic may be determined in part based on asset maintenance strategies or rules for different locations, including, for instance, a rule that a customer-facing front office location may be visited once a year by a technician, with less than two hours interruption per day. Another rule may include, for example, an office campus location can be visited multiple times year. The asset maintenance strategies for different locations may include rules 220 generally representing service constraints and a minimal interruption requirement. Example rules 220 may include, for instance, work time per asset, maximum duration per maintenance trip, maximum interruption per office location or branch, and a service window for an office. The rules 220 may be included as logical rules for constraints 215 used by system 100 to determine a route plan 280.

In some embodiments, real time information of each respective asset may include network information of each asset. The network information may include a respective network address (e.g., Internet Protocol (IP) address) indicating a network location of said asset on the respective network. The network information may include a respective physical address (e.g., Media Access Control Address (MAC) address) indicating a physical location of said asset on the respective network that can uniquely identify the asset on the network.

When a deployment ring includes a large number (e.g., over thousands) of IT assets in multiple networks, there may be a significant number of problem assets 240 due for maintenance based on batched data collected from one or more IT management platform 207 or other types of IT management tools. For instance, data from platform 207, which may include asset scores 209, are generally indicative of a condition or status of an IT asset in a previous time window (e.g., half an hour ago, six hours ago, or a week ago). When the total number of problem assets 240 due for maintenance in a development ring exceeds a certain threshold, computing a route plan or executing the route plan for maintaining all problem assets 240 can be computationally or financially expensive.

System 100 may, when a total number of problem assets 240 in a development ring or cluster exceeds a predefined threshold (e.g., 500), system 100 may be configured to refine the list of problem assets 240 for maintenance, prior to computing any cost matrix 210 or route plan 280, as to improve computing efficiency of cost estimation module 110 and route planning module 112 while ensuring that IT assets requiring maintenance are attended to in a route plan 280.

In an example embodiment, a first list of problem assets 240 for maintenance identified based on batched data in a cluster or deployment ring exceeds a predefined threshold of assets for maintenance, in this case, system 100 can be configured to obtain and use real time network condition or status of one or more IT assets in the first list of problem assets 240 to further refine the list, as to reduce the total number of problem assets 240 due for maintenance to below the threshold, prior to executing the cost estimation module 110.

In some embodiments, system 100 can use real time network condition or status of one or more IT assets in the first list of problem assets 240 for a development ring to further refine the list of one or more problem assets 240 due for maintenance. For instance, network data packets representing real time information of each respective asset may be received or retrieved by system 100 in real time as part of asset data for each respective asset in the deployment ring. System 100 may be implemented to query (e.g., "ping" or trace) one or more assets in one or more networks in the development ring to obtain real time network data originated from or sent by one or more assets in the first list of problem assets 240; the real time network data may include, for instance, one or more of: real time network traffic data, IP address, MAC address, host name, device status, domain name system (DNS) status, and network interface controller (NIC) data. Real time network traffic data may include network delay, packet loss, or jitter.

Once system 100 has obtained real time network data for one or more IT assets in the first list of problem assets 240, it can determine a real time condition or status of each respective asset in the one or more IT assets in the first list of problem assets 240 and make a determination as to keep or remove said asset from the list of problem assets 240 based on the real time network data. For instance, a problem asset in the list may have been previously identified as a problem asset due to unreasonable network delay but most recently repaired, and the real time network traffic data for said asset may indicate that the network delay is no longer significant enough to warrant a maintenance, thereby causing system 100 to remove the asset from the list of problem assets 240.

For another example, a problem asset in the list may have been previously identified as a problem asset having a high data packet loss rate, which may have been caused by network issues (not hardware issues relating to the asset itself), and the real time network traffic data for said asset may indicate that the data packet loss rate for the asset is now normal or within an acceptable range, thereby causing system 100 to remove the asset from the list of problem assets 240.

For yet another example, a problem asset in the list may have been previously identified as a problem asset due to being offline during normal operational hours, and the real time network data for said asset may indicate that the asset is now connecting to the network without abnormal events, thereby causing system 100 to remove the asset from the list of problem assets 240.

As can be seen, system 100 may, based on real time network data of the assets in the first list of problem assets 240, refine the first list of problem assets 240 to generate a final list of problem assets 240, which may replace the first list of problem assets 240, in order to provide improved computing efficiency for the subsequent modules such as cost estimation module and route planning module. This is a calibrated, practical and balanced implementation between monitoring the real time network traffic of all assets in the deployment ring, which is computationally expensive due to the amount of data volume passing through a deployment ring, and only using batched data to identify problem assets 240, which can include too many assets for downstream operations. System 100 is configured to selectively and intelligently monitor the real time network data for problem assets in a first list of problem assets generated based on batched data, to further refine the list of problem assets based on said real time network data of the assets, in order to achieve improved computing efficiency and solving the technical problem of having too many IT assets in a deployment ring for maintenance planning.

In some embodiments, real time information or network data of each respective asset may include network information of each asset. Such network information may include a respective network address (e.g., Internet Protocol (IP) address) indicating a network location of said asset on the respective network, as well as a respective physical address (e.g., Media Access Control Address (MAC) address) indicating a physical location of said asset on the respective network that can uniquely identify the asset on the network. System 100 can determine geographic location data 245 of a physical location for each asset 240 due for maintenance using its IP address, MAC address, or other information such as network information from DNS and local routers.

System 100 may, for instance, based on said network address and physical address for each asset 240, determine the location data 245 and in turn query a map data provider (e.g., OpenStreet™ Map) for map data 170 based on the location data 245 of the asset 240. The location data 245 may include, for instance, a set of geographic coordinates represented in latitude and longitude.

The location data 245 may also include, for instance, country, state or province, city, zip code, internet service provider (ISP), area code, and other information. The location data 245 for each asset 240 may be stored in local memory for downstream processing such as route planning.

Once system 100 has obtained all the location data 245 for the problem assets 240 and map data 170 corresponding to the location data 245, system 100 may group one or more assets in a cluster or deployment ring. In some embodiments, the grouping of assets 240 may be based on one or more definitions, such as, for instance, "Deployment Ring 123 includes all assets 240 located in the province of Ontario that require maintenance by date Oct. 31, 2023." Another example can be "Deployment Ring 456 includes all desktop computers that have an end-of-life date before Aug. 31, 2023, and with cash dispensing unit attached and located in BC, Canada".

Other criteria may be used to generate one or more clusters or deployment rings, such as assets that need to be refreshed with end-of-life date within 90 days for all the campus locations or having incompatible hardware models (pre-defined as well) to a new OS.

Figure 4A:
FIGS. 4A and 4B each shows an example user interface for viewing or managing IT assets in a deployment ring, in accordance with some embodiments.
Figure 4B:
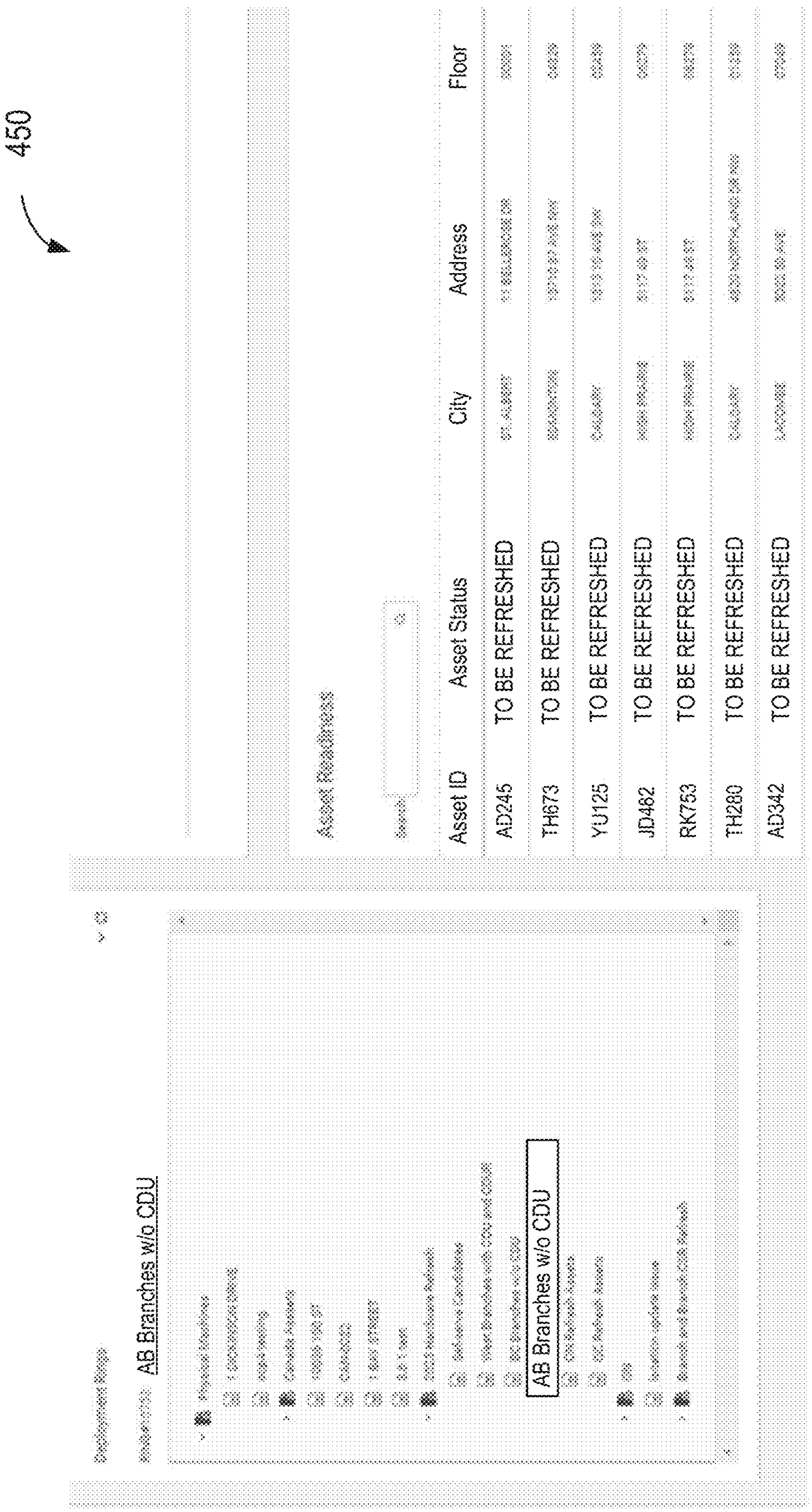

FIGS. 4A and 4B each shows an example user interface 400, 450 for viewing or managing IT assets such as assets 240 in a deployment ring, in accordance with some embodiments. User input from a scheduler (a user) may be received by system 100 for grouping the assets 240 by different dimensions like Branch vs. Campus, Distance to DSS Hubs, Desktop or Laptop for planning and tracking purpose.

With the flexible deployment ring tree structure displayed by system 100 on user interface display, a scheduler user can easily slice and dice the presented data representing IT assets in multiple dimension to plan and track the maintenance plan for a given set of assets.

Figure 5:
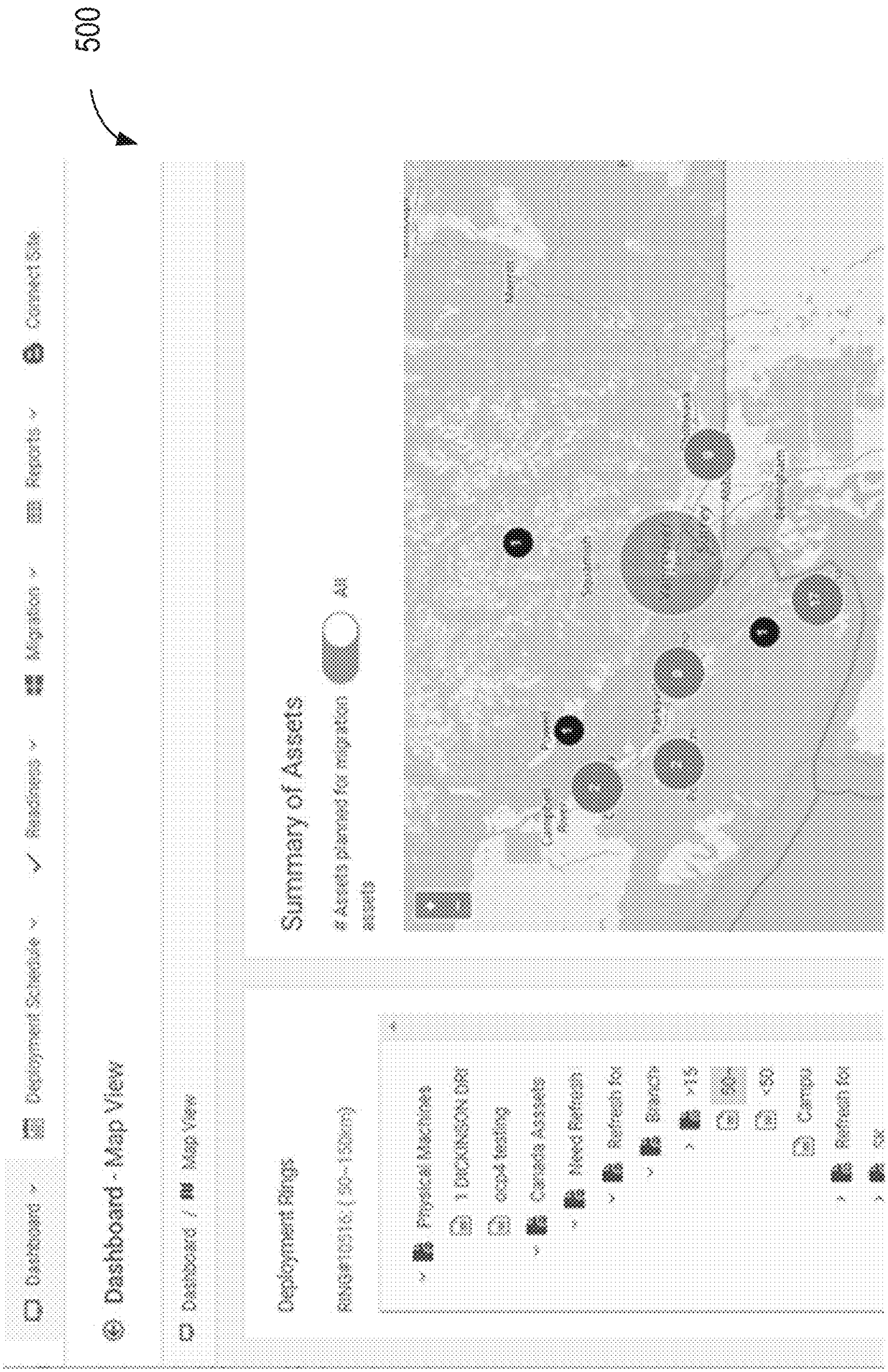
FIG. 5 shows an example user interface for viewing a subset of IT assets due for maintenance in a map view, in accordance with some embodiments.

FIG. 5 shows an example user interface 500 for viewing a subset of IT assets due for maintenance in a map view, in accordance with some embodiments.

As shown, a scheduler user can view a DSS Hub location along with locations of assets 240 on a map together with an office or branch name and number of assets that need to be serviced.

System 100 may further import MyOps™ information and the network switch information of each asset. A reliable physical location may thus be obtained by system 100 according to the physical location information of the network devices. Map data 170 may be used to visualize the physical location of the assets 240 on the map. With the flexible tree structure of the deployment rings, scheduler user can easily group the assets that need to be maintained in different dimension, e.g., by province or state, distance to DSS Hub (Service Center of Desk Side Support), EOL date, or by cost centers. Navigating through the ring structure, a scheduler user can display the map view in accordance with any pre-defined criteria. The detail location information along with the number of assets that need to be maintained can be shown to the user upon a click on an icon on the user interface, as rendered by the UI display module 115 of system 100.

Although direct space distance is easy and quick to calculate, it may not accurately reflect the actual travel time. For example, it might suggest flying over the sea since this is the shortest space distance. To accurately reflect the travel, a more sophisticated implementation is required. Routing and mapping modules need to take into account various factors including road condition, speed limit, and real time traffic data. In some embodiments, an existing mapping tool (e.g., Graphhopper™) may be implemented to calculate a first best travel path. Calculation of the optimized route requires resources and time. It may take up to one second to calculate the best route between two physical locations with distance of up to 500 km using existing mapping software or tool. However, without customization or further modification, this process will significantly slow down, as common in traditional routing methods, to find the best route when the number of physical office locations in a cluster or deployment ring is high, such as over 50 offices.

In some embodiments, a Vehicle Route Problem (VRP) approach may be implemented by route planning module 112, 212 to first determine a route plan 280 including trips 1, 2 . . . n for multiple vehicles with a predefined maximum travel time and capacity constraints. These constraints may be customizable according to different regions. Route planning module 112, 212 may be executed to optimize a route plan for one or more technicians so that they can travel with minimum cost, both in terms of travel time and physical distance, based on a cost matrix 210 computed by cost estimation module 110.

A route plan 280 may be generated by the route planning module 112, 212 for all assets 240 in a respective cluster or deployment ring, based on the computed cost matrix 210. Cost estimation module 110 may be executed by processor 104 to compute a cost matrix 210 for the assets 240 within the respective cluster or deployment ring. The route plan 280 may be optionally updated or adjusted in real time based on a number of factors and subsequently confirmed as a confirmed schedule 285.

Cost estimation module 110 may determine the cost matrix 210 based on one or more factors 250 including for instance, for each asset 240 in the respective cluster or deployment ring, one or more of: a respective asset EOL date, a respective asset total cost, EOL difference, residual cost, travel time, hourly rate, travel distance, and a distance cost.

In some embodiments, a cost matrix 210 may be computed based on:

$$\text{Cost}_{i,j} = \mathit{TravelTime}_{i,j} \cdot \mathit{HourlyRate} + \text{Distance}_{i,j} \cdot \mathit{DistanceCost} + |\text{Max}(\mathit{EolDate}_i) - \text{Max}(\mathit{EolDate}_j)| \cdot \frac{\Sigma \mathit{ResidualCost}}{\Sigma(\mathit{EolDate} - \text{Today})} \cdot \mathit{DepreciationDiscount}$$

where the computed cost $\text{Cost}_{i,j}$ represents a respective cost value to travel and consume from a first physical location i to a second physical location j. For example, when there are 100 locations in a deployment region or development ring, the cost matrix is then a 100×100 matrix.

For example, i represents a first physical location for a first asset from the at least two respective assets due for maintenance and j represents a second physical location for a second asset from the at least two respective assets due for maintenance.

For each physical location i, j, . . . with multiple assets, each of the assets has an end-of-life date EolDate. The assets in a physical location i, j may require maintenance and can be maintained when all the assets passed their respective or are close to their end-of-life date. Max($\text{EolDate}_i$) and Max ($\text{EolDate}_j$) each represents the latest end-of-life date among all EOL dates for all assets in the respective physical location i, j.

A residual cost ResidualCost is an estimated value of the asset (e.g. desktop computer) at the time the cost matrix is determined, e.g., $500. Since every asset may have different end-of-life date and book costs, the residual value will be different across all sets in a location. In the deployment ring, the earliest start date can be defined or chosen, and the residual value calculation is based on that earliest start date defined for that deployment ring.

Hourly rate HourlyRate represents an hourly cost for a technician to visit and complete the maintenance, and can be set to be a given value for a given deployment ring. Different hourly rates may be defined for different deployment rings. For instance, in one deployment ring, all the assets with cash dispense unit attached may need a more skilled technician with a higher hourly rate, while another deployment ring has only assets with no complicated peripherals attached, which can be serviced by junior technician having a less hourly rate.

The distance cost DistanceCost can be defined as a cost to drive a vehicle per distance unit (e.g., $30 per km). The distance cost can be dynamically adjusted based on vehicle type and market price of gas, electricity, or other types of fuel.

In some embodiments, in order to improve the performance, a route plan or parts of route plan may be pre-calculated in part or in whole in advance. Each time an updated map data is uploaded or otherwise received, the respective travel time and distance may change, therefore the route plan 260 may be adjusted or updated based on the updated map data. In addition, when a new physical location is added to a cluster by system 100, the travel time to and from the new locations are calculated and the corresponding route plan 280 for the cluster is updated.

Some assumptions may be coded into the programming logic by system 100, for instance, a technician from a hub in a first province may not travel to a different province for maintaining an asset, so pre-calculation of locations may be pre-calculated within a given province for a cluster, or for the province nearby.

In reality, it may take a significant amount of time and computing resource, such as a week to calculate the travel distance/time between every two physical locations within the nearby provinces. For instance, the total cached record of physical locations in a given real world example for a large corporation is at 809,251, which would generate about almost 4 MM records if travel distance and time between every two pairs of physical locations within the 809,251 locations are determined at once.

System 100, by pre-calculating some of the trips between two physical locations in a cluster, can generate an optimized suggestion for a 100 node problem within a short period of time, e.g., within one minute. This makes online, real-time re-calculation or calibration of a route plan 280 possible when a technician misses a target or gets delayed by the traffic, in which case the technician can, through user device 130, send and transmit user signals representing commands for re-calculating or updating the route plan in real time using a mobile interface of system 100 rendered on his or her device 130 to obtain the best route in view of the real time road condition, a current physical location as represented by a GPS location data of the mobile device 130, and the number of physical locations yet to be visited for maintenance in the route plan 280.

As a portion of the travel time, distance and cost are pre-calculated and stored as part of route plan 280 on system 100, a user command from user device 130 to re-calculate the route plan 280 can be efficient and delivered in a matter of seconds or minutes at most, as to enable the technician to continue on his or her assigned trip for maintaining the assets without undue delay.

In some embodiments, as each route plan 280 may include multiple trips for multiple technicians traveling in different regions or deployment rings with overlapping time window (s), system 100 may cause user device 130 to cache a portion of route plan 280 data on local memory of user device 130 only relevant to the technician user of user device 130 to aid with efficient updating of the route plan 280. In this manner, if unforeseeable event or network issues cause the user device 130 to disconnect from system 100, user device 130 may leverage the cached portion of route plan 280 to adjust or update the travel route for the technician without having to wait until the connection from system 100 resumes. The cached portion of route plan 280 may include, for example, the physical locations of all sites or offices for the user of user device 130, and necessary device identifying information (e.g., MAC address, physical location within a site, user ID) for all IT assets due for maintenance within the sites, and brief description of maintenance needs for each IT asset. System 100, while in connection with user device 130, can continue to update the cached portion of route plan 280 based on real time information received from network and from user device 130. For example, each time an IT asset 240 has been maintained on the current trip, its detailed information may be promptly removed from user device 130, as to occupy less memory storage on user device 130 and to facilitate relocation of computing resources (e.g., memory) for other usage.

Route planning module 112, 212 is implemented and executed to compute an initial or updated route plan 280. For instance, in some embodiments, route planning module 112, 212 may be implemented using Nearest Neighbor algorithm. Christofides Algorithm is another example for the classic travel salesperson problem resolution. Linear optimization is the algorithm behind or-tools, Google's problem solving library (OR-Tools v9.5. Laurent Perron and Vincent Furnon). Simulation Annealing is an algorithm used to find local minimum by iterations. After benchmark tests using physical location data from real world experiments, Simulated Annealing is selected for implementation in some embodiments as a feasible solution with heuristic of Path Cheapest Arc. In average, based on the comparison tables 900, 950 shown in FIG. 9, Simulated Annealing ("Hegira" in the tables) has 26% less travel time than PHP, 14% less than Nearest Neighbor (NN), and 9% less than Christofides Algorithm (CA).

In some embodiments, route planning module 112, 212 may be configured to implement a technical solution based on Multiple Travel Saleperson (MTSP) to generate a route plan 280, where one or more technicians can perform the maintenances in a route plan. The Multiple Traveling Salesman Problem (MTSP) is a generalization of the Traveling Salesman Problem (TSP), where multiple salesmen are involved to visit a given number of cities exactly once and return to the initial position with the minimum traveling cost.

In some embodiments, in order to perform pre-calculation of parts of a route plan 280, the route planning module 112, 212 may be configured to pre-calculate and store the travel time and distance between every two physical locations during a batch process, for all physical locations associated with all the assets 240 due for maintenance in a cluster or deployment ring. The pre-calculation of travel time and distance between every two physical locations may be used as input to calculate the cost matrix 210, which is pre-calculated for each deployment ring. System 100 may then store and update various parameters and costs for each cluster, e.g. hourly rate, travel cost, number of locations, and so on.

In the context of system 100, a one technician may start from a given service center associated with the deployment ring, visit all the locations in the route plan 280 and return to the service centre to finish the job. A maximum duration for the travel time and work time may be each defined via user input or imported from system default options. Route planning module 112, 212 can also determine the total number of trips, as well as the total numbers of technicians required. It can be one or multiple technicians taking multiple trips, one by one. Each route plan needs to be within in the maximum duration defined for that deployment ring, and a route plan may be closed in accordance with a maximum duration as defined. After the calculation, system 100 may inform the user how many trips are needed, and if additional technicians are needed to perform the tasks.

In some embodiments, as route plan 280 is pre-calculated in advance based on a given map and a number of physical locations, it may be dynamically updated based on the travelling technician's real time location/schedule/road conditions at the time of execution or service call. Said real time information may be received from the technician's mobile device or vehicle. Real time traffic or weather conditions may be obtained from external sources such as Google™ Maps.

Figure 7A:
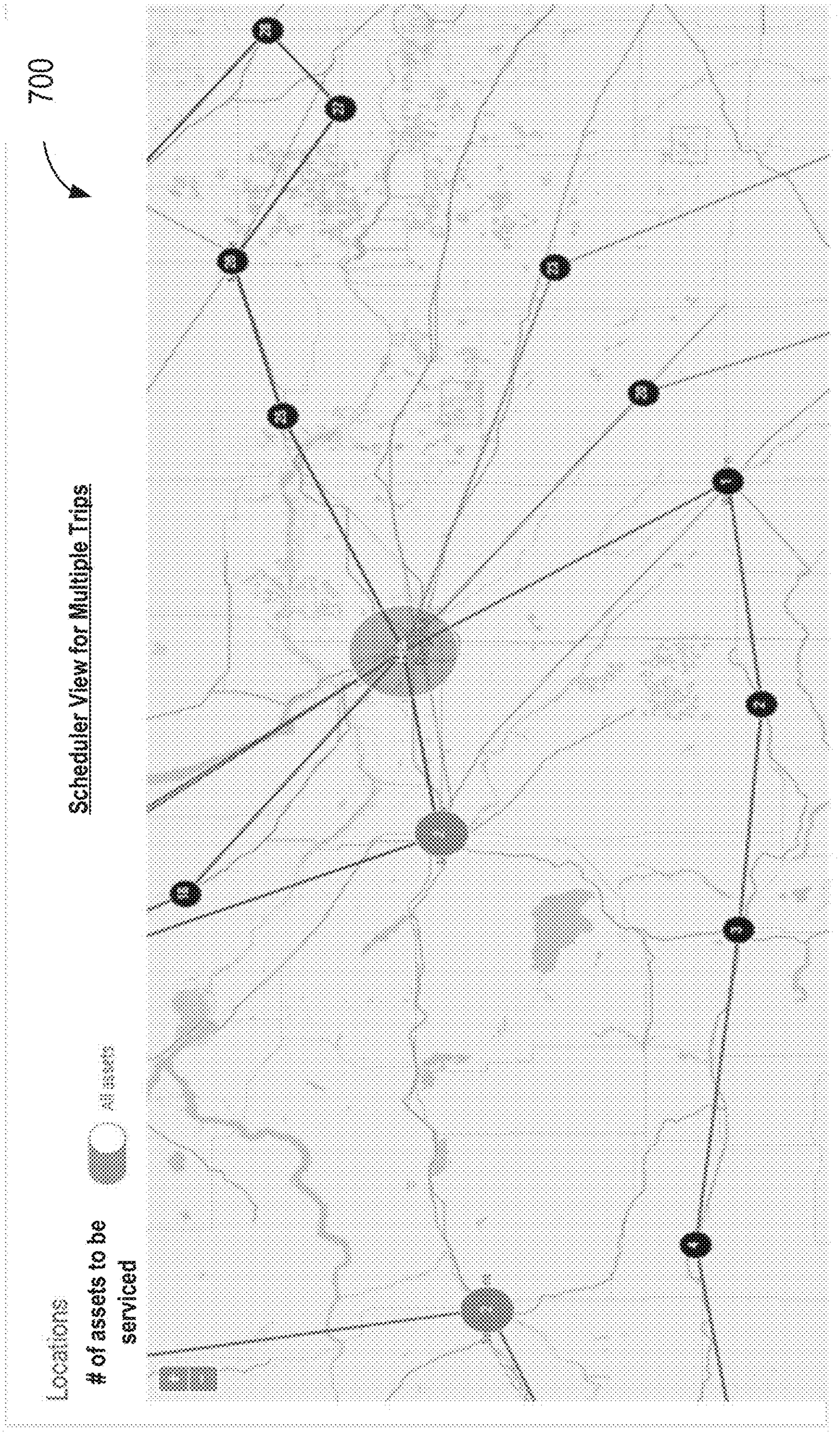
FIG. 7A shows an example user interface for viewing or managing IT assets in a map view based on an generated route plan, in accordance with some embodiments.
Figure 7B:
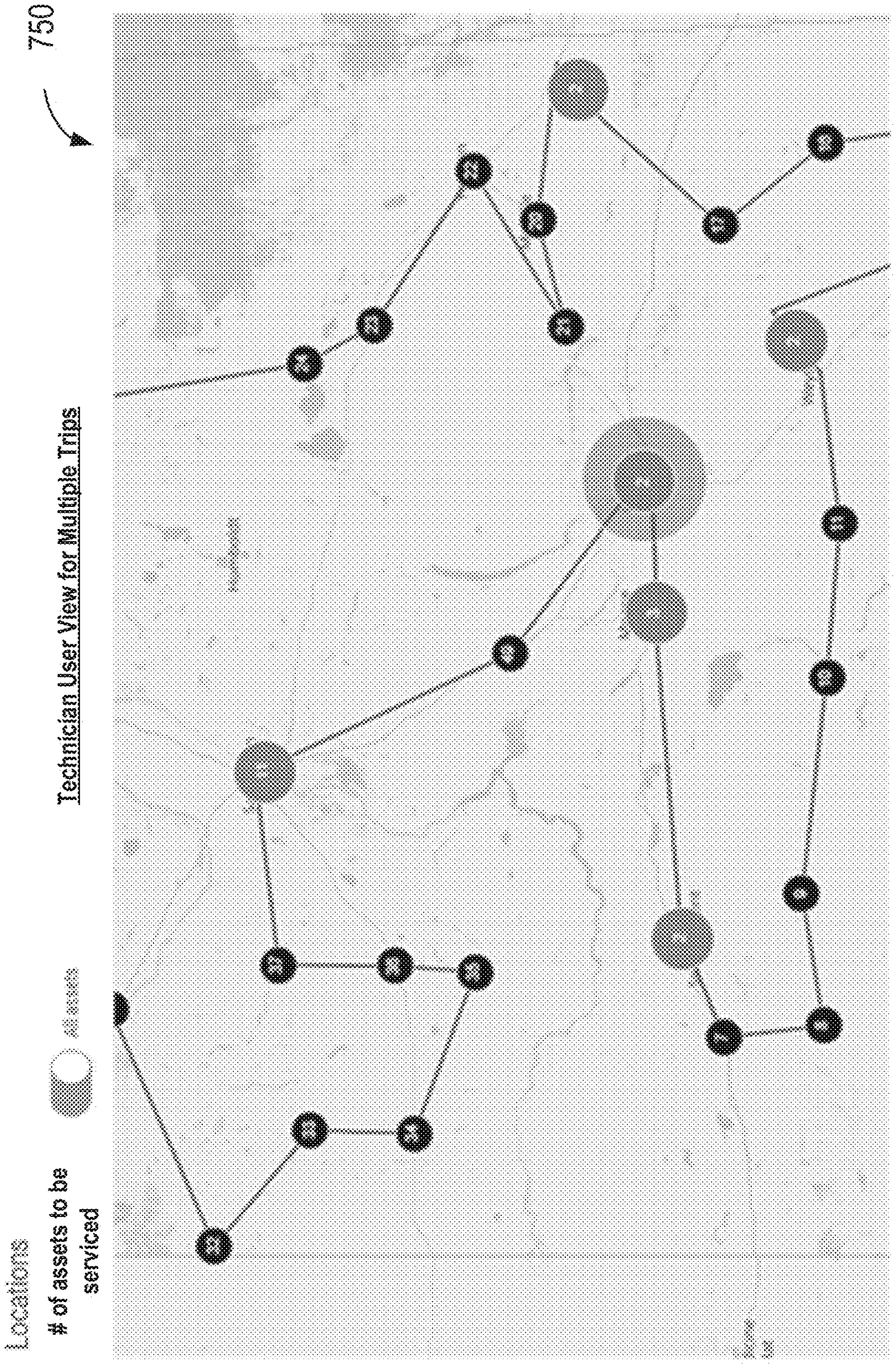
FIG. 7B shows another example user interface for viewing or managing IT assets in a map view based on an generated route plan, in accordance with some embodiments.

In some embodiments, when a technician is on the road as part of carrying out the route plan 280, 285, he or she may see the maps for each trip as presented in FIGS. 7B to 8B. FIG. 7B shows an example user interface 750 for multiple trips for maintaining IT assets in a map view based on an generated route plan 280, 285, as generated by UI display module 115 of system 100. Each circle corresponds to a physical location on the map and the number inside each circle indicates a total number of IT assets. The UI display module 115 of system 100 may generate signals to display different trips with different colors.

Figure 8A:
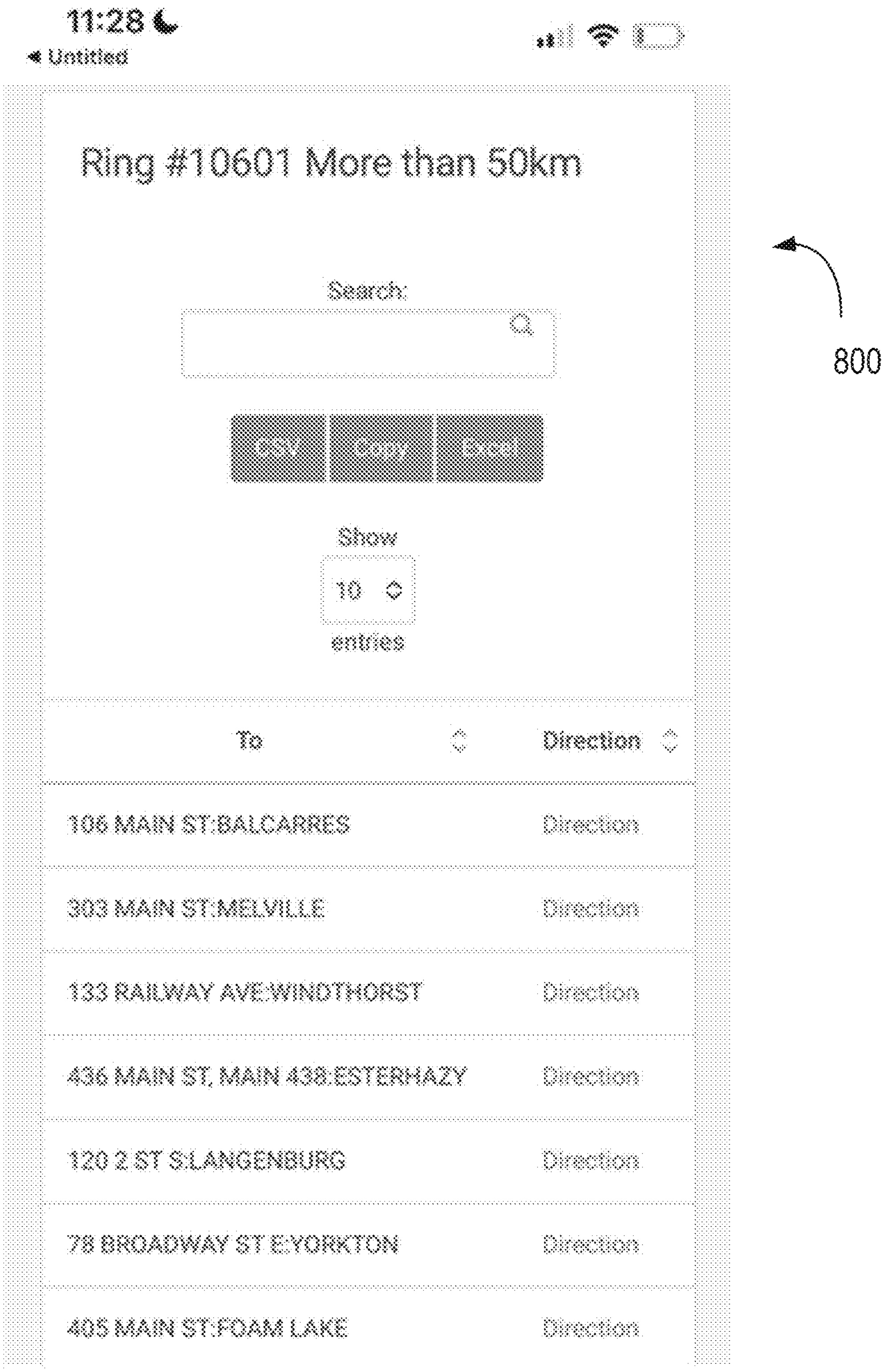
FIG. 8A shows an example user interface for viewing a route plan including multiple trips for maintaining IT assets for a specific technician user, in accordance with some embodiments.

FIG. 8A shows an example user interface 800 for viewing on a user device 130, such a mobile phone, a route plan 280, 285 including multiple trips for maintaining IT assets for a specific technician user, as generated by UI display module 115 of system 100. Each trip is shown with a destination and a link to a map that can provide real-time direction for the trip. The user may search for a specific trip using the search field on the user interface 800. The graphical user interface elements on user interface 800 can be rendered by an application or browser client on user device 130 based on data representing user interface elements transmitted from and generated by UI display module 115 of system 100.

Figure 8B:
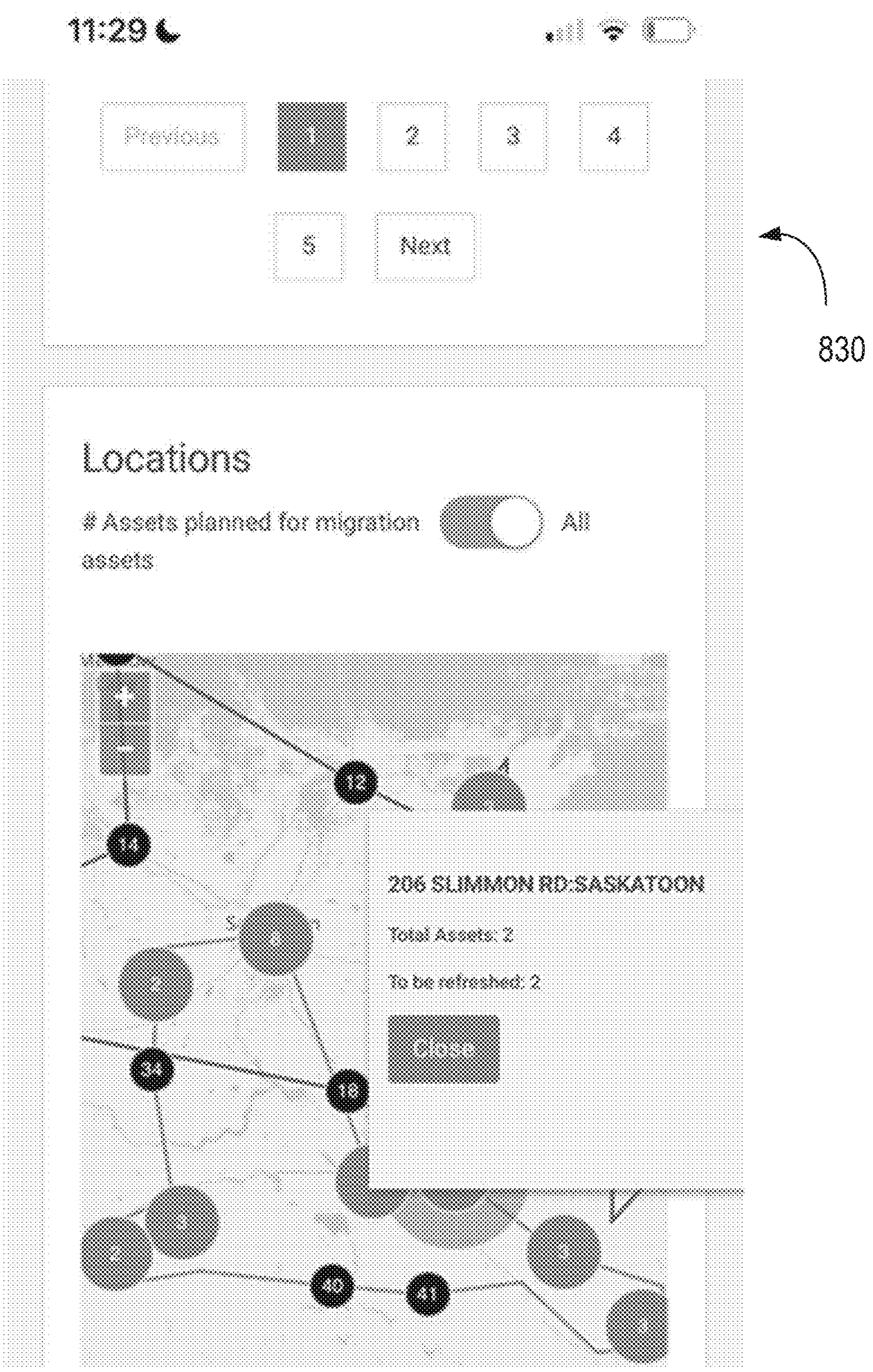
FIG. 8B shows an example user interface for viewing or managing IT assets in a map view for a specific technician user, in accordance with some embodiments.

FIG. 8B shows another example user interface 830 for viewing or managing IT assets in a map view for a specific technician user, as generated by UI display module 115 of system 100. The graphical user interface elements on user interface 830 can be rendered by an application or browser client on user device 130 based on data representing user interface elements transmitted from and generated by UI display module 115 of system 100.

The example user interface 830 displays a map, similar to the one in FIG. 7B, with multiple trips in the map view based on an generated route plan 280, 285. When a user clicks on a particular location, such as "206 SLIMMON RD: SASKATOON", a pop-up window, which may be implemented by JavaScript™, may be generated and overlaid on top of the map, showing a total number of assets and the number of assets to be maintained for the particular location.

Figure 8C:
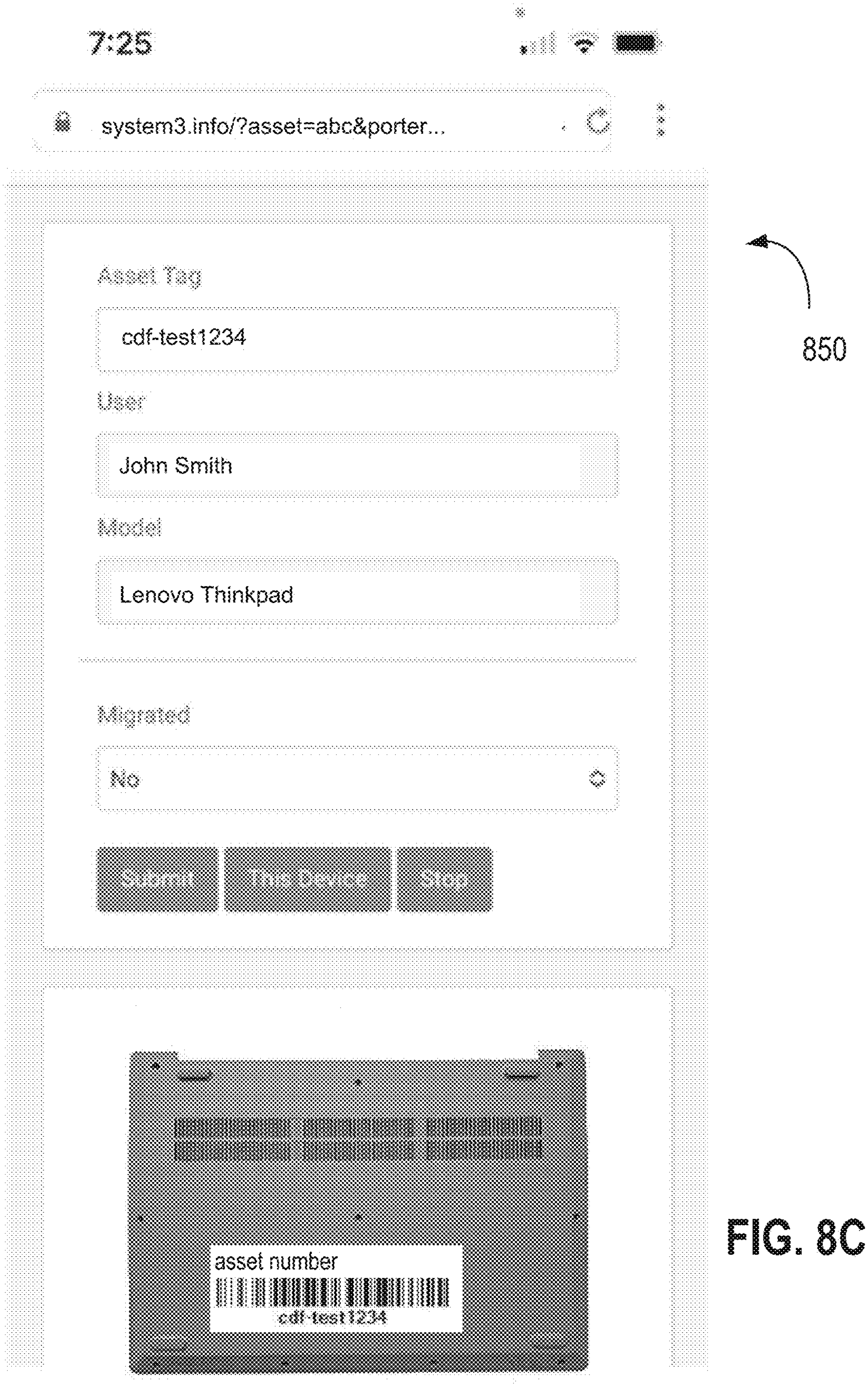
FIG. 8C shows an example user interface for viewing asset data for a given IT asset for a specific technician user, in accordance with some embodiments.

FIG. 8C shows an example user interface 850 for viewing asset data on user device 130 for a given IT asset, as generated by UI display module 115 of system 100. The graphical user interface elements on user interface 850 can be rendered by an application or browser client on user device 130 based on data representing user interface elements transmitted from and generated by UI display module 115 of system 100.

For instance, the asset data may be obtained in real time from system 100 by user device 130 upon sending an asset number or asset ID to system 100, which in this example is "cdf-test1234". The asset ID may be located on the physical asset, such as a laptop. The technician user may manually input the asset ID, or use the camera device of user device 130 to scan a barcode associated with the asset ID. The asset data retrieved from system 100 may include, for example, asset ID (or tag), user name, model, and a maintenance status (e.g., "migrated: no"). The technician user may further update asset data of the asset identified by asset ID or tag "cdf-test1234" as he performs the maintenance. For instance, he may change, via user input, the maintenance status of the asset from "migrated: no" to "migrated: yes" and submit the change. System 100 upon receiving the maintenance status update from user device 130, may update the relevant subsystems and other systems in real time or in batch.

If and when the technician deviates from the pre-calculated travel plan for any reason, system 100 may, either automatically upon detection of said deviation, or upon a user command from the technician received from user device 130, use the current physical location of the technician and the un-visited locations on the trips assigned to the technician in the route plan 280, re-calculate and update the route plan for just the single technician, based on the updated information.

Different constraints may be implemented by system 100 to ensure that the generated route plan 280 is customized for a user's needs.

One or more example constraints may be implemented in system 100, including, without limitation:

- Maximum hours a technician can spend on one trip.
- Maximum trips a technician can have.
- Maximum number of assets that can be completed in one visit.
- The location with lower residual costs from depreciation need to have higher priority.
- Different Start and End Point for each trip. (e.g. When the technician is delayed by traffic, he/she will need to re-calculate the route, but the starting location should be the current branch he/she is working on.
- Unit cost of the travel time.
- Unit cost of the work time.
- Unit cost of the travel distance.

FIG. 6 shows an example table view 600 for a route plan 280 including multiple trips for maintaining IT assets, as generated by system 100. The route plan 280 includes multiple trips, with each trip x have a respective origin Ax and destination Bx. As can be seen from table 600, the respective destination for a trip x may be the respective origin for the next trip x+1.

Route plan 280 generated by system 100 may provide multiple vehicle traveling to all locations with close EOL dates in the route plan to minimize write off residual costs.

A scheduler user can view a route plan 280 in map view, with a sequence of trips, where each trip is represented in a different colour for ease of reference. FIG. 7A shows an example user interface 700 for viewing or managing IT assets in a map view based on an generated route plan, as generated by UI display module 115 of system 100. A scheduler user can see multiple trips for the entire deployment ring, with each trip covering a respective portion of the assets. Each route plan 280 may include a sequence of trips to be undertaken by a respective technician. For example, red route represents trip 1 (for technician Alex) covering assets 1-9; purple route represents trip 2 (for technician Bob) covering assets 10-19; and grey route represents trip 3 (for technician Charlie) covering assets 20-29; and so on. If the service center has only one team or one technician to deliver the services, the technician or team can start from the service centre multiple times as well. Alternatively, a single technician can perform trips 1, 2 and 3 in consequence. The UI display module 115 of system 100 may generate signals to display different trips with different colors, where each colour may represent one or more trips designated for one respective technician.

Figure 10:
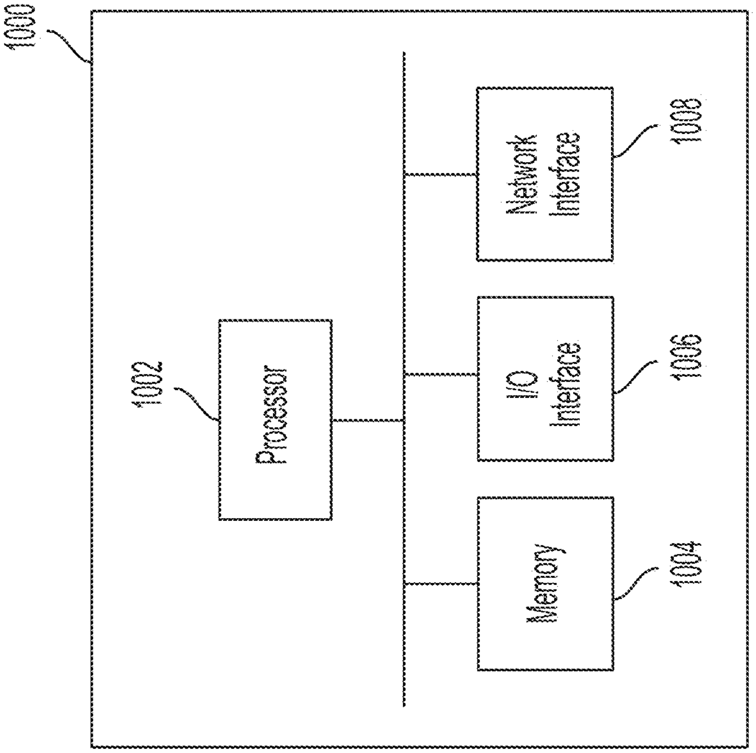
FIG. 10 shows an example schematic diagram of a computing device that implements a system for maintaining IT assets, in accordance with some embodiments.

FIG. 10 is a schematic diagram of an example computing device 1000 that implements a system (e.g., one or more components of system 100), in accordance with an embodiment. As depicted, computing device 1000 includes one or more processors 1002, memory 1004, one or more I/O interfaces 1006, and one or more network interfaces 1008.

Each processor 1002 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 1004 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 1004 may store code executable at processor 1002, which causes training system to function in manners disclosed herein. Memory 1004 includes a data storage device or hardware. In some embodiments, the data storage device includes a secure datastore. In some embodiments, the data storage device stores received data sets, such as textual data, image data, or other types of data.

Each I/O interface 1006 enables computing device 1000 to interconnect with one or more input devices, such as a keyboard, mouse, camera, touch screen and a microphone, or with one or more output devices such as a display screen and a speaker.

Each network interface 1008 enables computing device 1000 to communicate with other components, to exchange data with other components, to access and connect to network resources, to serve applications, and perform other computing applications by connecting to a network such as network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The methods and processes disclosed herein, including the process described below in view of FIG. 11, may be implemented using a system that includes multiple computing devices 1000. The computing devices 1000 may be the same or different types of devices.

Each computing devices may be connected in various ways including directly coupled, indirectly coupled via a network, and distributed over a wide geographic area and connected via a network (which may be referred to as "cloud computing").

For example, and without limitation, each computing device 1000 may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods described herein.

Figure 11:
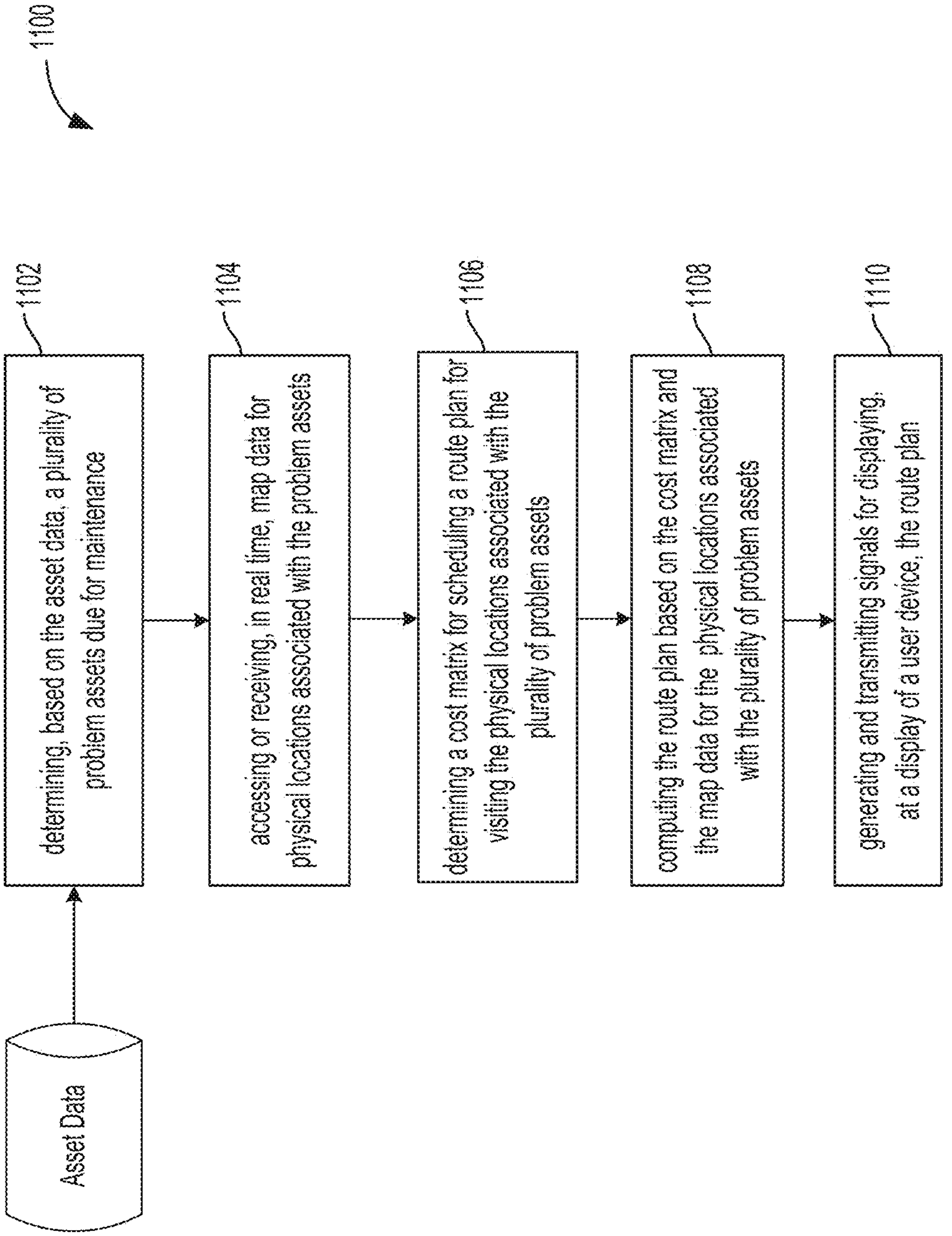
FIG. 11 shows an example process performed by a system for maintaining IT assets, in accordance with some embodiments.

FIG. 11 shows an example process 1100 performed by a system such as system 100 in FIG. 1, for maintaining IT assets, in accordance with some embodiments.

At operation 1102, system 100 accesses or receives asset data for a plurality of IT assets located in a plurality of physical locations. Then system 100 can determine, based on the asset data, a plurality of assets due for maintenance from the plurality of IT assets.

In some embodiments, the plurality of assets due for maintenance, which is a subset of the plurality of IT assets, is determined based on a given set of criteria.

In some embodiments, the respective asset data for each asset in the plurality of IT assets comprises a respective network address indicating a physical location of said asset.

At operation 1104, system 100 can access or receive, in real time, map data for physical locations associated with the plurality of assets due for maintenance.

At operation 1106, system 100 can determine a cost matrix for scheduling a route plan for visiting the physical locations associated with the plurality of assets due for maintenance.

In some embodiments, the cost matrix is determined based on one or more of: an end-of-life date $\text{EolDate}_i$, $\text{EolDate}_j$ for each of at least two respective assets i,j due for maintenance, a residual cost ResidualCost for each of the at least two respective assets due for maintenance, an hourly rate HourlyRate for a technician engaged to perform the maintenance for the at least two respective assets due for maintenance; an estimated travel time $\text{TravelTime}_{i,j}$ and estimated travel distance $\text{Distance}_{i,j}$ for the two physical locations associated with the least two respective assets due for maintenance based on the map data.

In some embodiments, the cost $\text{Cost}_{i,j}$ is determined based on a cost matrix example as shown below:

$$\text{Cost}_{i,j} = TravelTime_{i,j} \cdot HourlyRate + \text{Distance}_{i,j} \cdot DistanceCost + |\text{Max}(EolDate_i) - \text{Max}(EolDate_j)| \cdot \frac{\Sigma ResidualCost}{\Sigma(EolDate - \text{Today})} \cdot DepreciationDiscount$$

where i represents a first physical location for a first asset from the at least two respective assets due for maintenance and j represents a second physical location for a second asset from the at least two respective assets due for maintenance.

For example, i represents a first physical location for a first asset from the at least two respective assets due for maintenance and j represents a second physical location for a second asset from the at least two respective assets due for maintenance.

For each physical location i, j, . . . with multiple assets, each of the assets has an end-of-life date EolDate. The assets in a physical location i, j may require maintenance and can be maintained when all the assets passed their respective or are close to their end-of-life date. Max ($EolDate_i$) and Max ($EolDate_j$) each represents the latest end-of-life date among all EOL dates for all assets in the respective physical location i, j.

A residual cost ResidualCost is an estimated value of the asset (e.g. desktop computer) at the time the cost matrix is determined, e.g., $500. Since every asset may have different end-of-life date and book costs, the residual value will be different across all sets in a location. In the deployment ring, the earliest start date can be defined or chosen, and the residual value calculation is based on that earliest start date defined for that deployment ring.

Hourly rate HourlyRate represents an hourly cost for a technician to visit and complete the maintenance, and can be set to be a given value for a given deployment ring. Different hourly rates may be defined for different deployment rings. For instance, in one deployment ring, all the assets with cash dispense unit attached may need a more skilled technician with a higher hourly rate, while another deployment ring has only assets with no complicated peripherals attached, which can be serviced by junior technician having a less hourly rate.

Today represents the date on which the cost matrix is executed.

In some embodiments, a respective cost matrix is determined for each respective pair of assets due for maintenance in the plurality of assets.

In some embodiments, the route plan is computed based on the cost matrix and a set of constraints.

In some embodiments, the set of constraints include two or more of: an estimated service time per asset, a maximum duration for each trip, a maximum service period per physical location, and a predefined service window.

At operation 1108, system 100 can compute the route plan based on the cost matrix and the map data for the physical locations associated with the plurality of assets due for maintenance.

In some embodiments, the route plan 280, 285 is computed in advance based on the map data and the physical locations associated with the plurality of assets due for maintenance.

In some embodiments, the route plan 280, 285 is updated each time a new physical location is added as a result of additional assets identified due for maintenance.

For instance, if and when the technician deviates from the pre-calculated travel plan for any reason, system 100 may, either automatically upon detection of said deviation, or upon a user command from the technician received from user device 130, user the current physical location of the technician and the un-visited locations on the trips assigned to the technician in the route plan 280, re-calculate and update the route plan for just the single technician, based on the updated information.

Different constraints may be implemented by system 100 to ensure that the generated route plan 280, 285 is customized for a user's needs.

At operation 1110, system 100 can generate signals for displaying, at a display of a user device, the route plan; and transmit said signals to the user device for displaying the route plan.

FIG. 7B shows an example user interface 750 for multiple trips for maintaining IT assets in a map view based on an generated route plan 280, 285, as generated by UI display module 115 of system 100. Each circle corresponds to a physical location on the map and the number inside each circle indicates a total number of IT assets. The UI display module 115 of system 100 may generate signals to display different trips with different colors.

FIG. 8A shows an example user interface 800 for viewing on a user device 130, such a mobile phone, a route plan 280, 285 including multiple trips for maintaining IT assets for a specific technician user, as generated by UI display module 115 of system 100. Each trip is shown with a destination and a link to a map that can provide real-time direction for the trip. The user may search for a specific trip using the search field on the user interface 800.

FIG. 8B shows another example user interface 830 for viewing or managing IT assets in a map view for a specific technician user, as generated by UI display module 115 of system 100. The example user interface 830 displays a map, similar to the one in FIG. 7B, with multiple trips in the map view based on an generated route plan 280, 285. When a user clicks on a particular location, such as "206 SLIMMON RD: SASKATOON", a pop-up window, which may be implemented by JavaScript™ may be generated and overlaid on top of the map, showing a total number of assets and the number of assets to be maintained for the particular location.

An example user interface 850 in FIG. 8C for viewing asset data on user device 130 for a given IT asset can be rendered by an application or browser client on user device 130, based on user interface elements and other data transmitted from and generated by UI display module 115 of system 100. The asset data may be obtained in real time from system 100 by user device 130 upon sending an asset number or asset ID to system 100, which in this example is "cdf-test1234". The asset ID may be located on the physical asset, such as a laptop. The technician user may manually input the asset ID, or use the camera device of user device 130 to scan a barcode associated with the asset ID. The asset data retrieved from system 100 may include, for example, asset ID (or tag), user name, model, and a maintenance status (e.g., "migrated: no"). The technician user may further update asset data of the asset identified by asset ID or tag "cdf-test1234" as he performs the maintenance. For instance, he may change, via user input, the maintenance status of the asset from "migrated: no" to "migrated: yes" and submit the change. System 100 upon receiving the maintenance status update from user device 130, may update the relevant subsystems and other systems in real time or in batch.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The foregoing discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term “connected” or “coupled to” may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information.

The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The embodiments and examples described herein are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A computer system for maintaining IT assets, the computer system comprising:
- a processor; and
- a non-transitory memory storing one or more sets of instructions that when executed by the processor, causes the system to:
  - access or receive asset data for a plurality of IT assets located in a plurality of physical locations in a deployment ring, wherein the asset data for each respective IT asset comprises a respective network address indicating a network location of said asset;
  - determine, based on the asset data, a first list of assets due for maintenance from the plurality of IT assets;
  - responsive to a total number of assets in the first list exceeding a predefined threshold, query real-time network data for one or more assets in the first list, and refine the first list based on the real-time network data to generate a refined list of assets due for maintenance;
  - determine, based on the respective network address for each asset in the refined list, geographic location data for a physical location of each asset in the refined list;
  - access or receive, in real time, map data for the physical locations associated with the refined list of assets due for maintenance;
  - determine a cost matrix for scheduling a route plan for visiting the physical locations associated with the refined list of assets due for maintenance;
  - compute the route plan based on the cost matrix and the map data for the physical locations associated with the refined list of assets due for maintenance;
  - generate signals for displaying, at a display of a user device, the route plan; and
  - transmit said signals to the user device for displaying the route plan.

2. The system of claim 1, wherein the plurality of assets due for maintenance is determined based on a pre-defined set of criteria.

3. The system of claim 1, wherein the respective asset data for each asset in the plurality of IT assets comprises a respective network address indicating a physical location of said asset.

4. The system of claim 1, wherein the cost matrix is determined based on one or more of: an end-of-life date for each of at least two respective assets due for maintenance, a residual cost for each of the at least two respective assets due for maintenance, an hourly rate for a technician engaged to perform the maintenance for the at least two respective assets due for maintenance; and an estimated travel time and travel distance for the two physical locations associated with the least two respective assets due for maintenance based on the map data.

5. The system of claim 4, wherein the cost matrix is determined based on:

$$\text{Cost}_{i,j} = \textit{TravelTime}_{i,j} \cdot \textit{HourlyRate} + \text{Distance}_{i,j} \cdot \textit{DistanceCost} + |\text{Max}(\textit{EolDate}_i) - \text{Max}(\textit{EolDate}_j)| \cdot \frac{\Sigma \textit{ResidualCost}}{\Sigma(\textit{EolDate} - \text{Today})} \cdot \textit{DepreciationDiscount}$$

where i represents a first physical location for a first asset from the at least two respective assets due for maintenance and j represents a second physical location for a second asset from the at least two respective assets due for maintenance.

6. The system of claim 5, wherein a respective cost matrix is determined for each respective pair of assets due for maintenance in the plurality of assets due for maintenance.

7. The system of claim 1, wherein the route plan is computed based on the cost matrix and a set of constraints.

8. The system of claim 7, wherein the set of constraints include two or more of: an estimated service time per asset, a maximum duration for each trip, a maximum service period per physical location, and a predefined service window.

9. The system of claim 1, wherein the route plan is computed in advance based on the map data and the physical locations associated with the plurality of assets due for maintenance.

10. The system of claim 9, wherein the route plan is updated each time a new physical location is added as a result of additional assets identified due for maintenance.

11. A computer-implemented method for maintaining IT assets, the method comprising:

accessing or receiving asset data for a plurality of IT assets located in a plurality of physical locations in a deployment ring, wherein the asset data for each respective IT asset comprises a respective network address indicating a network location of said asset;

determining, based on the asset data, a first list of assets due for maintenance from the plurality of IT assets;

responsive to a total number of assets in the first list exceeding a predefined threshold, querying real-time network data for one or more assets in the first list, and refining the first list based on the real-time network data to generate a refined list of assets due for maintenance;

determining, based on the respective network address for each asset in the refined list, geographic location data for a physical location of each asset in the refined list;

accessing or receiving, in real time, map data for the physical locations associated with the refined list of assets due for maintenance;

determining a cost matrix for scheduling a route plan for visiting the physical locations associated with the refined list of assets due for maintenance;

computing the route plan based on the cost matrix and the map data for the physical locations associated with the refined list of assets due for maintenance;

generating signals for displaying, at a display of a user device, the route plan; and transmitting said signals to the user device for displaying the route plan.

12. The method of claim 11, wherein the plurality of assets due for maintenance is determined based on a predefined set of criteria.

13. The method of claim 11, wherein the respective asset data for each asset in the plurality of IT assets comprises a respective network address indicating a physical location of said asset.

14. The method of claim 11, wherein the cost matrix is determined based on one or more of: an end-of-life date for each of at least two respective assets due for maintenance, a residual cost for each of the at least two respective assets due for maintenance, an hourly rate for a technician engaged to perform the maintenance for the at least two respective assets due for maintenance; and an estimated travel time and travel distance for the two physical locations associated with the least two respective assets due for maintenance based on the map data.

15. The method of claim 14, wherein the cost matrix is determined based on:

$$\text{Cost}_{i,j} = \textit{TravelTime}_{i,j} \cdot \textit{HourlyRate} + \text{Distance}_{i,j} \cdot \textit{DistanceCost} + |\text{Max}(\textit{EolDate}_i) - \text{Max}(\textit{EolDate}_j)| \cdot \frac{\Sigma \textit{ResidualCost}}{\Sigma(\textit{EolDate} - \text{Today})} \cdot \textit{DepreciationDiscount}$$

where i represents a first physical location for a first asset from the at least two respective assets due for maintenance and j represents a second physical location for a second asset from the at least two respective assets due for maintenance.

16. The method of claim 11, wherein the route plan is computed based on the cost matrix and a set of constraints.

17. The method of claim 16, wherein the set of constraints include two or more of: an estimated service time per asset, a maximum duration for each trip, a maximum service period per physical location, and a predefined service window.

18. The method of claim 11, further comprising computing the route plan in advance based on the map data and the physical locations associated with the plurality of assets due for maintenance.

19. The method of claim 18, further comprising:

receiving asset data for an additional asset identified due for maintenance; and updating the route plan when the additional asset is associated with a new physical location.

20. A non-transitory computer readable medium storing machine interpretable instructions, which when executed by a processor, cause the processor to perform:

accessing or receiving asset data for a plurality of IT assets located in a plurality of physical locations in a deployment ring, wherein the asset data for each respective IT asset comprises a respective network address indicating a network location of said asset;

determining, based on the asset data, a first list of assets due for maintenance from the plurality of IT assets;

responsive to a total number of assets in the first list exceeding a predefined threshold, querying real-time network data for one or more assets in the first list, and refining the first list based on the real-time network data to generate a refined list of assets due for maintenance;

determining, based on the respective network address for each asset in the refined list, geographic location data for a physical location of each asset in the refined list;

accessing or receiving, in real time, map data for the physical locations associated with the refined list of assets due for maintenance;

determining a cost matrix for scheduling a route plan for visiting the physical locations associated with the refined list of assets due for maintenance;

computing the route plan based on the cost matrix and the map data for the physical locations associated with the refined list of assets due for maintenance;

generating signals for displaying, at a display of a user device, the route plan; and transmitting said signals to the user device for displaying the route plan.

* * * * *